United States Patent [19]
Beelitz

[11] Patent Number: 6,032,223
[45] Date of Patent: Feb. 29, 2000

[54] SYSTEM AND METHOD FOR DETERMINING A RAM DISK LOGICAL DRIVE DESIGNATION

[75] Inventor: Alan E. Beelitz, Austin, Tex.

[73] Assignee: Dell USA, L.P., Round Rock, Tex.

[21] Appl. No.: 08/951,137

[22] Filed: Oct. 15, 1997

[51] Int. Cl.[7] .................................................. G06F 13/14
[52] U.S. Cl. .............................. 711/104; 711/4; 711/111; 711/112; 711/170; 711/173
[58] Field of Search ................................ 711/104, 4, 111, 711/112, 170, 203, 10; 395/651

[56] References Cited

U.S. PATENT DOCUMENTS

| | | | |
|---|---|---|---|
| 5,606,681 | 2/1997 | Smith et al. | 711/203 |
| 5,771,354 | 6/1998 | Crawford | 395/200.59 |
| 5,809,300 | 9/1998 | Utsumi et al. | 395/651 |
| 5,842,011 | 11/1998 | Basu | 395/652 |
| 5,896,546 | 4/1999 | Monahan et al. | 710/10 |

OTHER PUBLICATIONS

Microsoft Systems Journal vol. 8, No. 9, Sep. 1993, J. Prosise, "MS–DOS questions and answers", pp. 85–87, and also IAC Accession No. 14145778.
Windows Sources vol. 1, No. 5, Jun. 1993, Jun. 1993, J. McGarvey, "New uses for RAM disks", pp. 398–399, and also IAC Accession No. 13736768. See section entitled "Speeding .TMP Storage".
PC Magazine vol. 11, No. 2, Jan. 28, 1992, J. Prosise, "Tutor", pp. 287–288, and also IAC Accession No. 11712686. See section entitled "Swapping to Memory".

*Primary Examiner*—Eddie P. Chan
*Assistant Examiner*—Than Nguyen
*Attorney, Agent, or Firm*—Haynes & Boone, L.L.P.

[57] ABSTRACT

A system and method for determining a drive letter used by a RAM disk and communicating that designator to other programs is disclosed. In a computer having a processor for running operating system code, RAM, and a hard drive memory device, the RAM includes a RAM disk configured therein and the hard drive memory device includes at least one partition. The operating system code recognizes both the RAM disk and the hard drive partition as logical drives and therefore contains a series of at least two drive parameter blocks (DPB), one DPB for each logical drive. The computer also includes a software routine for determining a drive letter assigned to the RAM disk and communicating that drive letter to another program. First of all, the routine must ascertain the drive letter assigned to the RAM disk by sequentially performing the following steps: accessing a DPB from the series, examining the logical drive designated by the DPB, and determining if the logical drive is the RAM disk. Once the routine ascertains which DPB is associated with the RAM disk, it then retrieves the drive letter assigned to that DPB and stores the drive letter in a predetermined location. Therefore, a program may access the RAM disk by referencing the predetermined location.

12 Claims, 1 Drawing Sheet

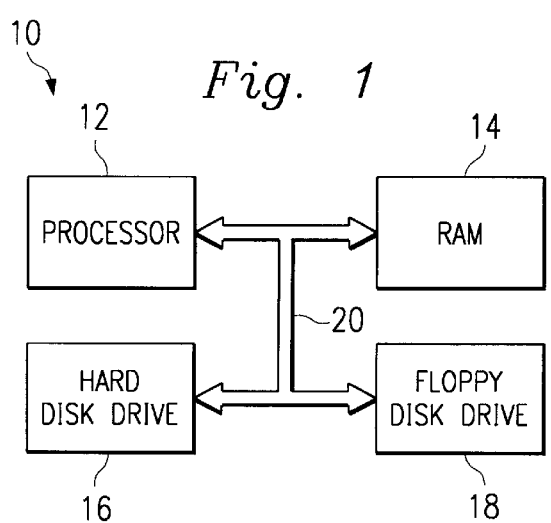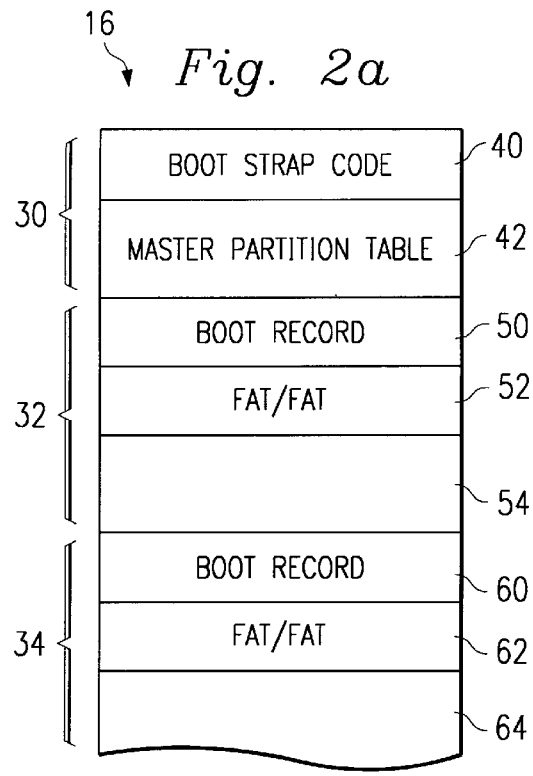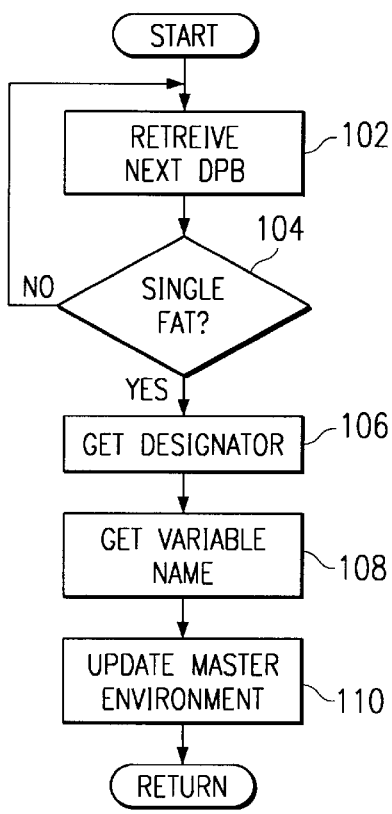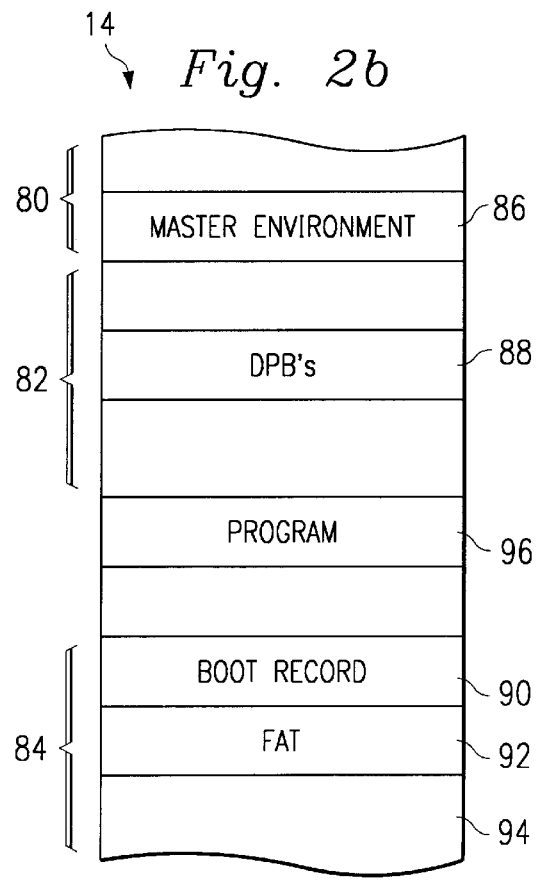

SYSTEM AND METHOD FOR DETERMINING A RAM DISK LOGICAL DRIVE DESIGNATION

BACKGROUND

The present disclosure relates generally to computers and software code for controlling access to a computer storage device, and, more specifically, to a system and method for determining a drive determinator used by a volatile storage device and communicating that designator to other programs.

Typically, a computer includes several different storage devices, such as a bank of random access memories (RAM), a hard disk drive and/or a floppy disk drive. The above mentioned storage devices behave differently, and are therefore used differently. RAM provides for very fast but volatile storage of data while the hard disk drive and floppy disk drive (collectively disk drives) provide somewhat slower, but non-volatile storage. Because of their different behaviors and uses, typically disk drives are used for long term storage while RAM is used for short term storage. However, there exists programs, such as RAMDRIVE by Microsoft Corp. of Redmond, Wash., that allow a computer to use the RAM as if it were a disk drive, i.e., a RAM disk. The RAM disk can be used for various applications, even though it is a volatile storage device.

For the sake of example, an application that would benefit from using a RAM disk is a download process used by computer manufacturers for installing software onto a new computer. By using a RAM disk, the download process can run faster, the non-volatile storage devices can remain unused and therefore un-fragmented, and any temporary files created on the RAM disk will be destroyed due to the volatile nature of the RAM disk.

However, using a RAM disk in a download process has several associated difficulties. In operating systems such as DOS, Windows, or Windows 95 by Microsoft Corp., hereinafter represented by DOS, logical drive determinators, or drive letters, for the various logical storage devices on the computer are assigned in sequence, with the drive letter assigned to the RAM disk being determined after all the logical drives on non-volatile storage devices have been assigned their respective drive letters. Therefore, the drive letter to be assigned to the RAM disk is unknown and likely to be different from computer to computer.

Once the drive letter for each logical drive, including the RAM disk, has been assigned, the drive letter for the RAM disk needs to be transmitted to the download process. However, DOS does not support inter-process communications, i.e., the assigned drive letter can not be transmitted to the download process via a DOS environment. A DOS environment is an instantiation of a DOS master environment which contains a series of variable assignments for use by DOS and other programs running on the computer. It is understood that the DOS master environment and instantiations thereof are well understood by those of ordinary skill in the art and therefore, for the sake of clarity and brevity, will not be further discussed.

Therefore, what is needed is a system and method that would allow a process, such as a software download process, to learn the drive determinator for a RAM disk for later use by the process.

SUMMARY

In response thereto, provided is a system and method for determining a drive determinator used by a volatile storage device and communicating that designator to other programs. In one embodiment, a computer includes a processor for running operating system code, RAM, and a hard drive memory device. The RAM includes a RAM disk configured therein and the hard drive memory device includes at least one partition. The operating system code recognizes both the RAM disk and the hard drive partition as logical drives and therefore contains a series of at least two drive parameter blocks (DPB), one DPB for each logical drive. The computer also includes a software routine for determining a drive letter assigned to the RAM disk and communicating that drive letter to another program.

First, the routine must ascertain the drive letter assigned to the RAM disk by sequentially performing the following steps: accessing one DPB from the series, examining the logical drive designated by the DPB, and determining if the logical drive is the RAM disk. Certain predefined characteristics of logical drives allow the routine to determine whether or not it is a RAM disk. For example, a hard drive partition conventionally has two copies of its file allocation table while a RAM disk conventionally has only one.

Once the routine ascertains which DPB is associated with the RAM disk, it retrieves the drive letter assigned to that DPB. The routine then stores the drive letter in a predetermined location, such as a master environment of the operating system. Therefore, a program may access the RAM disk by referencing the predetermined location.

The above summary illustrates only some of the many different potential embodiments. Additional embodiments are further described below.

BRIEF DESCRIPTION OF THE DRAWINGS

FIG. 1 is a block diagram of a computer including a processor, hard drive and RAM for implementing one embodiment.

FIG. 2a is a layout configuration of the hard drive of the computer of FIG. 1.

FIG. 2b is a layout configuration of the RAM of the computer of FIG. 1 after the computer had been booted.

FIG. 3 is a flow chart of a routine to be run by the computer of FIG. 1.

DETAILED DESCRIPTION OF THE PREFERRED EMBODIMENT

Referring to FIG. 1, the reference numeral 10 designates a computer having several components, including at least one processor 12, RAM 14, a hard disk 16, and a floppy disk 18. Each component is capable of communication with the processor 12, as graphically represented by a general bus 20. In the present example, the processor 12 is running DOS operating system code. It is understood, however, that the computer 10 and its illustrated components are merely representative of many different types of computers and components and that DOS is merely representative of many different types of operating systems well known and understood by those of ordinary skill in the art.

Referring to FIG. 2a, the computer 10 subdivides the hard disk 16 into three different partitions: a master boot record 30, a first partition 32, and a second partition 34. Located in the master boot record 30 is boot strap code 40 and a master partition table 42. The partitions 32,34 are logical partitions, each including a boot record 50, 60, respectively, a file allocation table ("FAT") 52, 62, respectively, and a storage area 54, 64, respectively. Although not specifically illustrated, the floppy disk 14 is also appropriately configured to provide another logical partition. The configuration and manipulation of storage devices such as the hard disk 16 and the floppy disk 14 are further described in the book THE HARD DISK SURVIVAL GUIDE by Mark Minasi, SYBEX, Inc., 1991, which is hereby incorporated by reference.

Referring to FIG. 2b, the RAM 14 stores a plurality of data structures, some of which can be generically defined as basic system code 80, DOS operating code 82, and a RAM disk 84. The basic system code 80 includes, among other things, a master environment 86 that contains a series of variable assignments. Although not shown, it is understood that additional instantiations of the master environment 86 may exist throughout RAM 14, as conventionally necessary. DOS 82 contains many structures, including a plurality of drive parameter blocks (DPB's) 88. There exists one DPB for each logical drive, which in the present example, is four: the floppy disk 18, the partition 32, the partition 34, and the RAM disk 84. The RAM disk 84 is formatted similarly to the partitions 32, 34, including a boot record 90, a FAT 92, and a storage area 94. However, as is conventional with most drive formatting procedures, the RAM disk has only one copy of the FAT 92 while the floppy disk 18 and both partitions 32,34 each have two copies of their respective FATs 52, 62. Also stored in the RAM 14 is a program 96. For the sake of example, the program 96 is a software download process that would benefit from using the RAM disk 84.

Referring to FIG. 3, a routine 100 determines a drive letter used by the RAM disk 84 and communicates that letter to the program 96. Before the routine begins, the computer 10 has been booted and the RAM 14 has been configured as described above. During the boot up procedure, DOS has assigned specific drive letters to each logical drive. In the present embodiment, these designators are as described in Table 1, below. Also, the routine 100 has been invoked by the program 96 and has been provided with a predetermined variable, discussed in greater detail, below.

TABLE 1

| Logical Drive | Letter |
| --- | --- |
| floppy disk 18 | A: |
| partition 32 of hard disk 16 | B: |
| partition 34 of hard disk 16 | C: |
| RAM disk 84 | D: |

At step 102, the routine 100 retrieves a first DPB from the group of DPBs 88 in the RAM 14. In the present embodiment, the DPB's are retrieved sequentially from the RAM 14. At step 104, the routine 100 counts the number of copies of the FAT for the logical drive designated by the retrieved DPB. If there is more than one copy of the FAT, the logical drive is part of a non-volatile storage device such as the hard disk 16 or floppy disk 18. Execution then returns to step 102 where the routine 100 retrieves the next DPB. If, however, at step 104 only one copy of the FAT is counted, the logical drive is the RAM disk 84 and execution proceeds to step 106. Although not shown, error control mechanisms may also be included to properly handle error situations, such as when no RAM disk exists. At step 106, the routine 100 retrieves the drive letter corresponding to the last DPB is retrieved. In the example described above, the letter is D:.

At step 108, the routine 100 retrieves the predetermined variable from the program 96, which was provided when the program invoked the routine, as described above. For the sake of example, the program 96 has been configured to use a logical drive which it references with the variable name "TEMP". Therefore, when the program 96 invoked the routine 100, the program 96 supplied the name TEMP to the routine. At step 110, the routine 100 updates the master environment 86 with the assignment of the retrieved letter to the predetermined variable, for example:

TEMP=D:\.

Execution then returns to the program 96.

As a result, any references made by the program 96 to the variable TEMP will be directed to the RAM disk 84. Furthermore, the above routine 100 works with any configuration of logical drives, even multiple RAM disks.

Although illustrative embodiments have been shown and described, a latitude of modification, change and substitution is intended in the foregoing disclosure, and in certain instances, some features will be employed without a corresponding use of other features. For example, other peculiarities between volatile and non-volatile storage devices can be used to distinguish between the two and achieve results as shown above. Furthermore, additional features, such as error handling routines, may be added to the illustrative embodiment without altering the scope of the invention. Accordingly, it is appropriate that the appended claims be construed broadly and in a manner consistent with their scope.

What is claimed is:

1. A computer comprising:
   at least one processor for running operating code;
   at least one volatile storage accessible by the processor;
   means for allocating at least a portion of the volatile storage as a logical drive, the logical drive having an indicator unique to volatile storages, wherein the indicator is a number of file allocation tables;
   a non-volatile storage accessible by the processor, wherein the allocating means also allocates at least a portion of the non-volatile storage as another logical drive;
   a storage location accessible by the processor;
   the operating code, including a designator to the logical drive; and
   a routine for assigning the designator to a predetermined variable stored in the storage location, wherein the routine determines which of the logical drives represents a volatile storage by examining the indicator;
   wherein after the routine assigns the designator to the predetermined variable, a program may access the logical drive by designating the predetermined variable.

2. The computer of claim 1, wherein the volatile storage is random access memory (RAM) and the accessed portion of the volatile storage device has been preconfigured as a RAM disk.

3. The computer of claim 1 wherein the volatile storage is random access memory (RAM) and the non-volatile storage is a hard disk.

4. The computer of claim 1 wherein the volatile storage is random access memory (RAM) and the non-volatile storage is a floppy disk.

5. In a computer comprising a volatile logical drive, a non-volatile logical drive, and an operating system, a method for determining a designator assigned to the volatile logical drive by the operating system and communicating that designator to a program, wherein the operating system includes a series of at least two data blocks, one data block for each logical drive, the method comprising the steps of:

a) until the designator assigned to the volatile logical drive has been determined, performing the steps of:

i) retrieving one data block from the series;

ii) examining the logical drive designated by the retrieved data block;

iii) determining if the logical drive is the volatile logical drive;

iv) if the logical drive is the volatile logical drive, retrieving the designator assigned to the retrieved data block;

b) assigning the designator to a predetermined variable; whereby, the program may reference the volatile logical drive by referencing the predetermined variable;

wherein the computer further comprises a master environment and wherein the step of assigning further comprises storing the predetermined variable and the designator in the master environment;

wherein the volatile logical drive includes a single file allocation table and the non-volatile drive includes two file allocation tables, and wherein the step of determining counts the number of file allocation tables in the logical drive.

6. The method of claim 5, wherein the volatile logical drive represents a random access memory disk.

7. The method of claim 5, wherein the non-volatile logical drive represents a partition of a hard disk.

8. The method of claim 5, wherein the non-volatile logical drive represents a floppy disk.

9. A software device for allowing a process to learn of and utilize a logical drive created in a predetermined partition of a computer's volatile memory, the computer further including one or more additional logical drives and a processor for running operating code having a series of parameter blocks for each logical drive, the software device comprising:

a storage medium for storing the software device;

means for retrieving one parameter block in the series;

means for determining if the retrieved parameter block designates the volatile memory logical drive;

means, responsive to a determination that the retrieved parameter block does not designate the volatile memory logical drive, for retrieving another parameter block in the series;

means, responsive to a determination that the retrieved parameter block does designate the volatile memory logical drive, for learning a designator assigned by the operating code to the retrieved parameter block; and means for storing the designator in a predetermined location for use by the process, wherein the predetermined location is a variable assignment location in a master environment used by the operating code and wherein the process uses the designator by reference to the variable assignment location, wherein the volatile memory logical drive includes a single file allocation table, and wherein the determining means counts the number of file allocation tables in each logical drive.

10. The software device of claim 9, wherein the volatile memory logical drive represents a random access memory (RAM) disk.

11. The software device of claim 9, wherein one of the additional logical drives represents a partition of a hard disk.

12. The software device of claim 9, wherein one of the additional logical drives represents a floppy disk.

* * * * *